United States Patent
Rabie et al.

(10) Patent No.: US 7,092,356 B2
(45) Date of Patent: Aug. 15, 2006

(54) RESOURCE MANAGEMENT IN HETEROGENOUS QOS-BASED PACKET NETWORKS

(75) Inventors: Sameh A. Rabie, Kanata (CA); Osama Aboul Magd, Kanata (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 881 days.

(21) Appl. No.: 09/970,883

(22) Filed: Oct. 5, 2001

(65) Prior Publication Data

US 2003/0076829 A1 Apr. 24, 2003

(51) Int. Cl.
*H04L 12/26* (2006.01)

(52) U.S. Cl. .................... 370/230; 370/395.21

(58) Field of Classification Search ............ 370/230, 370/231, 235, 252, 395.2, 395.21, 395.43, 370/400, 468
See application file for complete search history.

(56) References Cited

U.S. PATENT DOCUMENTS

| | | | | |
|---|---|---|---|---|
| 6,201,810 | B1 * | 3/2001 | Masuda et al. | 370/395.32 |
| 6,553,014 | B1 * | 4/2003 | Shobatake | 370/331 |
| 6,625,155 | B1 * | 9/2003 | Dziong | 370/395.2 |
| 6,765,873 | B1 * | 7/2004 | Fichou et al. | 370/235 |
| 6,785,737 | B1 * | 8/2004 | Lee et al. | 709/241 |
| 2002/0049855 | A1 | 4/2002 | Porotsky | |

FOREIGN PATENT DOCUMENTS

| | | |
|---|---|---|
| EP | 0 785 652 | 7/1997 |
| EP | 1 069 801 A1 | 1/2001 |
| WO | WO 01/54357 A1 | 7/2001 |

OTHER PUBLICATIONS

Saewoong Bahk, et al., "Preventive Congestion Control Based Routing in ATM Networks", 1994, ICC '94, Supercomm/ICC '94, Conference Record, 'Serving Humanity Through Communications.' IEEE Internationa Conference on New Orleans, LA, USA May 1-5 1994, New York, NY, USA, IEEE, May 1, 1994, pp. 1592-1599. XP010126616 ISBN 0-7803-1825-0.

* cited by examiner

*Primary Examiner*—Man U. Phan
*Assistant Examiner*—Toan Nguyen

(57) ABSTRACT

The invention relates generally to data communication networks and more particularly to a method of bandwidth management in a multiservice connection-oriented network which uses one or more overlooking factors and one or more overbooking models. The method allows an edge node which has received a connection request to accurately determine the bandwidth available on a given link in the network, by ensuring that different overlooking models and different overbooking factors are normalized at the edge node. The method of the present invention comprise: receiving at a selected one of the edge nodes updates from each of the core detailing a bandwidth management model, one or more overbooking factors and the link capacity associated with each of the core nodes; receiving at the selected one of the edge nodes a connection request; determining at the selected one of the edge nodes a preferred route through the network by accounting for a variation in overbooking factors or bandwidth management models between the selected one of said the nodes and each of the core nodes.

21 Claims, 13 Drawing Sheets

| Overbooking Method used by Edge Node | Overbooking Method used by Core Node | Possible Outcome |
|---|---|---|
| Classic | Classic | Correct Admission |
| Enhanced | Enhanced | Correct Admission |
| Classic | Enhanced | Reject Connection |
| Enhanced | Classic | Crankback |

FIGURE 6
(Prior Art)

| Overbooking Method used by Edge Node | Overbooking Method used by Core Node | Action by receiving/Edge node |
|---|---|---|
| Classic | Classic | No action |
| Enhanced | Enhanced | No action |
| Classic | Enhanced | Multiply available BW by overbooking factor |
| Enhanced | Classic | Divide available BW by overbooking factor |

FIGURE 9

RESOURCE MANAGEMENT IN HETEROGENOUS QOS-BASED PACKET NETWORKS

BACKGROUND TO THE INVENTION

1. Field of Invention

The invention relates generally to data communication networks and more particularly to a method of bandwidth management within such a network.

2. Description of the Related Prior Art

FIG. 1 depicts a connection-oriented multiservice network 8. The network 8 is used to establish a call between a source customer premise equipment (CPE) 10 and a destination CPE 12. The source CPE 10 originates a connection with the network 8 at an ingress edge node 14, which propagates the network 8 through a series of intermediate or core nodes 16 to an egress edge node 18 to establish a call to the destination CPE 12. As will be appreciated by those in the art, ingress or egress nodes 14, 18 and intermediate nodes 16 may be routers or switches. These terms will be used interchangeably herein to denote a physical network device that forwards data. The network 8 may consist of an Asynchronous Transfer Mode (ATM) network running Private Network to Node Interface (PNNI) routing protocol, an Internet Protocol (IP) network running Multi Protocol Label Switching (MPLS) and either the Open Shortest Path First—Traffic Engineering (OSPF-TE) routing protocol or the Intermediate System—Intermediate System Traffic Engineering (IS-IS-TE) routing protocol, or the like. Data traffic through network 8 travels over a series of links 20. Each link 20 is basically a communications channel or path. Each node 14, 16, 18 includes a connection admission control (CAC) component 22.

FIG. 2 illustrates a functional block diagram of the components and the operational concepts behind CAC 22. CAC 22 includes a processor 24 that is in communication with a memory 26 and an application module 28. CAC 22 receives a number of inputs, managed and processed by the various CAC elements 24, 26, 28, to process a connection request made by CPE 10. CAC 22 ultimately determines whether a connection request (made by the CPE 12) can be accepted 30 or rejected 32. The inputs include: (a) allocated capacity 34 which represents the total reserved bandwidth by all connections using a given link 20; (b) link capacity 36 which represents the total bandwidth on a given link 20; (c) Quality of Service (QoS) requirements 38 required by the connection; and (d) traffic descriptors 40 which characterize the requirements of the incoming request.

As indicated above, CAC is a function that determines whether an incoming connection request will be accepted or denied and ensures that existing connections are not affected when a new one is established. Using the inputs described above, a CAC algorithm determines whether a new connection setup request can be accepted or should be rejected. This decision is based on the constraint to meet the negotiated QoS requirements of all existing connections as well as of the new connection. Beside this basic function of CAC there is the secondary goal to maximize the system utilization by allowing for a statistical multiplexing gain, i.e. an efficient CAC method should accept as many connections as possible without violating any QoS guarantees. CAC is performed as part of the connection setup process and generally runs as a software module on processor 24. There are a variety of algorithms available to perform admission control.

With respect to an Asynchronous transfer mode (ATM) network, CAC can be defined as the set of actions taken by the network during the call set-up phase to establish whether a virtual channel/virtual path (VC/VP) can be made. With traffic control in ATM networks, there are two classes of QoS parameters which are considered for connection admission control:

(a) Traffic Descriptors—A set of parameters that characterize the source traffic i.e. Peak cell rate, Average cell rate, burstiness and peak duration etc.; and
(b) QoS Requirements—A set of parameters to denote the required quality of service class expressed in terms of cell transfer delay, delay jitter, cell loss ratio and burst cell loss etc.

Often assumptions are made about the traffic carried in the network. However, CAC can only rely on the traffic parameters negotiated in the service level agreement (SLA) entered into between a client and service provider. In an ATM environment, a typical SLA stipulates QoS objectives and traffic characteristics for the following service categories:

(a) Constant Bit Rate (CBR);
(b) Real Time Variable Bit Rate (rt-VBR);
(c) Non-Real Time Variable Bit Rate (nrt-VBR);
(d) Available Bit Rate (ABR); and
(e) Unspecified Bit Rate (UBR).

With respect to the PNNI routing protocol, it will be understood by those in the art that this protocol is a virtual circuit routing protocol which is used to route a signaling request through an ATM network. This is also the route on which the ATM connection is set up, and along which the data will flow. The PNNI routing protocol allows for the distribution and updating of a topology database resident at each node in network 8. PNNI supports link state routing in which each node sends information to every other node in the network regarding the state of all of its links (i.e. QoS and reachability information). The PNNI topology state packets (PTSP) containing this information are "flooded" or advertised to the routing database maintained in each node in the network. As will be appreciated by those in the art, topology state information includes the following two parameters:

(a) Non-additive link attributes used to determine whether a given network link or node can meet a requested QoS. Examples of such attributes include available cell rate (ACR), cell rate margin (CRM), variation factor (VF), etc.; and
(b) Additive link metrics that are used to determine whether a given path, consisting of concatenated links and nodes (with summed link metrics) can meet the requested QoS. Examples of such metrics include maximum cell transfer delay (MCTD); maximum cell delay variation (MCDV); maximum cell loss ratio (MCLR); etc.

There are two kinds of CAC:

(a) Generic CAC (GCAC)—This utilizes a quick and not so accurate algorithm which is used for route selection i.e. it allows a source node to calculate the equivalent bandwidth (EBW) for source routing determination; and
(b) Actual CAC (ACAC)—This utilizes a more accurate algorithm at each node along the path determined using GCAC. The algorithm verifies in real-time the bandwidth availability on a link-by-link basis using an EBW calculation i.e. it is used to guarantee QoS.

It will be understood by those in the art that the EBW calculation attempts to predict, based on source traffic descriptors, the required bandwidth for a given connection request, while building in a safety of margin to avoid circuit overloading (i.e. the calculation typically determines a suitable bit rate which falls between the average bit rate and the peak rate). The goal in calculating the EBW is to ensure that the sum of the EBW values of the accepted connections does not exceed the capacity of the designated link.

The GCAC algorithm makes use of standardized link parameters that any node can use to calculate the expected CAC behavior of another node, given that node's advertised link parameters and the requested QoS of the new connection request. Referring again to FIG. 1, using the GCAC algorithm, a node presented with a connection request processes the requests as follows:

(a) all links that cannot provide the requested ACR and those whose CLR exceeds that of the requested connection, are "pruned" from the set of possible paths;
(b) from the reduced set of paths, along with the advertised reachability information, a shortest path computation is performed to determine a set of one or more possible paths to the destination;
(c) the possible paths are further pruned by using the additive link metrics, such as delay. One of the acceptable paths would then be chosen; and
(d) the request is then forwarded along the chosen path.

Using ACAC, each node in the path still performs its own CAC on the routed request because its own state may have changed since it last advertised its state. If the link associated with the node is unacceptable, which is quite possible especially in large networks, to avoid excessive connection failures and retries, PNNI also supports crankback. Crankback is where a connection, which is blocked along a selected path, is rolled back to an intermediate node, earlier in the path. The intermediate node attempts to discover another path to the final destination, using the same procedure as the original node, but uses newer, and hopefully more accurate, network state information.

One technique used in CAC is known as overbooking or oversubscription. Overbooking, which allows the total EBW used by the admitted connections to exceed permissible traffic limits, assumes that some or all active connections are not using the maximum available resources. More specifically, overbooking refers to the exploitation of statistical bandwidth sharing between applications and connections, and uncertainty about the bandwidth demands of various applications. For example, not all connections or applications are active at the same time. Overbooking looks at the bandwidth on a given link which has been reserved, against the actual utilization at a given point in time, and allocates the spare capacity to other connection requests.

Under the classic link bandwidth management model, link bandwidth can be partitioned into multiple pools or shared in a single pool. Each pool can support one or more applications or QoS classes. Three sub-models are available:

(a) Full sharing—uses a single pool which supports all QoS classes. This model offers maximum link efficiency and simplified provisioning and operations;
(b) Full partitioning—each service class (e.g. CBR, VBR-rt, UBR, etc.) is put into its own pool. This model guarantees a defined amount of bandwidth on the link to each service class; and
(c) Hybrid model—some service classes are combined in one pool (e.g. CBR and rt-VBR), while others service classes are in separate pools.

In either (a), (b) or (c), link overbooking is achieved by applying an overbooking factor to each pool.

The example in FIG. 3 represents a full sharing model. Link 41 extending between nodes 42, 44 has an actual capacity of 100 Mbit/sec. A single pool 46 is used to accommodate all service categories from CBR to UBR. Based on historical data detailing the usage of the link an overbooking factor is determined e.g. 3. In the example of FIG. 3, the link capacity of 100 Mbit/sec is multiplied by the overbooking factor of 3 to give a virtual bandwidth availability of 300 Mbit/sec. Multiplying the link capacity by the overbooking factor is a "Classical" approach to overbooking. Edge node 47 making a connection request looks at its topology database, which has received advertised information regarding the available bandwidth of link 41. Because the advertised bandwidth of each node accounts for overbooking, edge node 47 appears to see a link with 300 Mbit/sec less any capacity assigned to calls in progress. GCAC is performed at edge node 47 which does not need to account for overbooking (already accounted for in the inflated pool). ACAC at each node is then performed. The EBW calculated by ACAC at each node also does not account for overbooking. If sufficient capacity is available to meet the QoS requirements of all existing connections as well as of the new connection, the call is admitted. The full sharing model can be problematic in that it treats all classes of data equally by using the same overbooking factor. Further there is no minimum guarantee for any service class.

FIG. 4 depicts the hybrid model in which multiple pools are used. Link 48 has an actual capacity of 10 Mbit/sec. In this case, two bandwidth pools 50, 52 are assigned different service categories, as well as a portion of the link capacity (e.g. pool 50 services CBR and rt-VBR traffic and is assigned 30% of the link capacity, while pool 52 services nrtVBR, ABR and UBR traffic and is assigned 70% of the link capacity). Based on historical data, each pool 50, 52 is assigned a separate overbooking factor (e.g. 3, 4). The allotted portion of the actual link capacity (e.g. 30%×10 Mbit/sec) is multiplied by the assigned overbooking factor (e.g. 3) to give a virtual available bandwidth for each pool (e.g. pool 50 has BW=9 Mbit/sec). The available bandwidth based on the inflated pools is advertised and used by GCAC and ACAC to determine which calls should be admitted. Typically, lower class pools are overbooked more than higher class pools. This ensures that real time data (e.g. video) associated with a higher class pool has a greater probability of being admitted when a connection request is made. The hybrid model is advantageous in that there is a minimum bandwidth guarantee for each pool of classes.

In either a single or multiple pool model, there are problems with an approach in which the actual link capacity is multiplied by an overbooking factor. This methodology is counter-intuitive in that users normally think of bandwidth reservation as it relates to the actual amount of bandwidth used or required for each connection, not in terms of pool sizes. In addition, advertised available link capacity can exceed actual link capacity. Finally, this approach limits the ability to tune the network traffic scheduler to suit the needs of different applications and connections.

In order to overcome the above deficiencies, an "Enhanced" overbooking model was created which incorporated a user-configurable application specific and/or QoS specific overbooking factor which could be applied on a class-by-class basis. The same overbooking factor is used per application/QoS, independent of the number of pools used. The pool size is not enlarged for overbooking purposes i.e. the reservation factor results in a pool size typically equaling the link capacity. As will be explained below, the reserved bandwidth for a given service category is determined by dividing the EBW by an overbooking factor associated with each service category.

An example of the enhanced overbooking model is depicted in FIG. 5. A full sharing model is depicted in which pool 54 handles CBR, rt-VBR, nrt-VBR and UBR traffic. The available bandwidth for the pool (broken down by service/QoS category for ATM PNNI) is advertised to every other node. A connection request requiring a specified service category is received at an edge node. The request is then processed using a GCAC algorithm, resulting in an optimal route through the network that satisfies the bandwidth requirement. ACAC is then applied against each link 56 in the selected route to validate bandwidth availability.

After applying the CAC algorithms, the edge node applies an appropriate overbooking factor to the calculated EBW. The calculated EBW is divided by the per service category overbooking factors to give the actual bandwidth reserved for the application i.e.

CBR Reserved Bandwidth=$CAC$ $EBW$÷$CBR$ Overbooking Factor rt-VBR Reserved Bandwidth=$CAC$ $EBW$÷rt-$VBR$ Overbooking Factor nrt-VBR Reserved Bandwidth=$CAC$ $EBW$÷nrt-$VBR$ Overbooking Factor UBR Reserved Bandwidth=$CAC$ $EBW$÷$UBR$ Overbooking Factor Based on the above calculations, it is determined if the connection for the service category requested can be supported by comparing the available bandwidth for the link/pool with the calculated reserved bandwidth.

The advertised bandwidth does not account for overbooking as in the classic model. It should be noted that different overbooking factors can be used for different service categories, but they should be uniform throughout the network. The use of different overbooking parameters at different nodes/links is not possible, unless the overbooking parameters are propagated throughout the network through network/policy management configuration, signaling during initialization, or advertised available bandwidth flooding.

A problem arises when the nodes operating using the classical bandwidth management model (i.e. multiplying the overbooking factor by the actual link capacity assigned to a pool or pools) must communicate with nodes operating using the enhanced bandwidth management model (i.e. where the edge node GCAC & ACAC EBW is divided by a service category overbooking factor). This may arise where the equipment of different vendors is present in the network. For the purposes of explanation, a network in which respective nodes use the same bandwidth management model will be defined as a homogenous network, while a network in which respective nodes use a different bandwidth management model will be defined as a heterogeneous network. A problem arises because the advertised information from each node results in the storing of inconsistent information in the topology database regarding the available capacity per service category. For example, if a node uses the classical overbooking model, the advertised available bandwidth for the link would equal the actual available bandwidth multiplied by the overbooking factor, whereas a node using the enhanced model would advertise the available bandwidth for the link as the actual available capacity. As a result, the GCAC calculation at a given ingress node could make wrong decisions either by: (a) admitting too many calls resulting in network crankbacks, which would cause connection setup/rerouting delays and waste network resources; or (b) rejecting calls which would otherwise be accepted. Additionally, sub-optimal routing and load balancing could result because of inconsistent information in the topology database.

FIG. 6 highlights the possible outcome of a connection admission request depending on the overbooking model used by the core and edge nodes. In the specific example of FIG. 7, the edge node 58 uses a classic bandwidth management model, while core node 60 uses an enhanced bandwidth management model. The EBW calculated by edge node 58 would not account for overbooking. As well, advertised bandwidth by core node 60 does not account for overbooking. As a result, GCAC performed by edge node 58 may reject calls which would be accepted by core node 60 because the advertised bandwidth appears to be very limited.

It should also be noted that the examples outlined in the above examples assumed that the overbooking factors were uniform throughout the network. This is not always true and can further complicate the connection admission process if the process is unable to account for the different overbooking factors associated with a given link in the network. There therefore exists a need for a solution which will allow nodes in a heterogeneous network, which may also include different overbooking methods and factors, to overcome the connection admission problems outlined above.

SUMMARY OF INVENTION

In order to overcome the deficiencies of the prior art, the invention provides a method of performing CAC at an edge node in a network where the network nodes use different overbooking models and/or different overbooking factors. Each edge node in the network is provided with the overbooking model/factor(s) and available bandwidth from each core node in the network. Using the received information, an edge node processing a connection admission request normalizes the advertised available bandwidth i.e. the advertised available bandwidth is presented in a consistent manner to the edge node. The edge node is then able to perform connection admission control using the normalized advertised bandwidth.

One aspect of the invention comprises a method of bandwidth management in a heterogeneous multiservice connection-oriented network, the heterogeneous network supporting one or more classes of data traffic and defined by edge nodes interconnected with core nodes, with pairs of the edge and core nodes being interconnected by a link having a prescribed link capacity, the method comprising: (a) receiving at a selected one of the edge nodes updates from each of the core nodes detailing a bandwidth management model, one or more overbooking factors and the available link capacity associated with each of the core nodes; (b) receiving at the selected one of the edge nodes a connection request; and (c) determining at the selected one of the edge nodes a preferred route through the network by accounting for a variation in overbooking factors or bandwidth management models between the selected one of the edge nodes and each of the core nodes.

Another aspect of the invention comprises an edge node for performing bandwidth management in a heterogeneous multiservice connection-oriented network, the heterogeneous network supporting one or more classes of data traffic and defined by edge nodes interconnected with core nodes, with pairs of the edge and core nodes being interconnected by a link having a prescribed link capacity, the edge node comprising: (a) a processor; (b) a memory communicating with said processor; and (c) an application module communicating with said processor; wherein said memory has contained therein instructions for allowing the processor to: (i) receive updates from each of said core nodes detailing a bandwidth management model, one or more overbooking factors and the available link capacity associated with each of said core nodes; (ii) receive a connection request; and (iii) determine a preferred route through said network by accounting for a variation in overbooking factors or bandwidth management models between itself and each of said core nodes.

The advantages of the invention are significant. In large networks where a variety of nodal equipment may be in place, each edge node will be able to confidently predict available routes through the network, by normalizing the bandwidth advertised from each node in the network. This will serve to minimize crankback as well as the number of connection requests which are prematurely denied.

BRIEF DESCRIPTION OF THE DRAWINGS

FIG. 6 depicts a table outlining possible overbooking problems in a heterogenous network;

FIG. 9 depicts a table outlining solutions to overbooking problems in a heterogenous network;

DESCRIPTION OF THE PREFERRED EMBODIMENT

Figure 1:
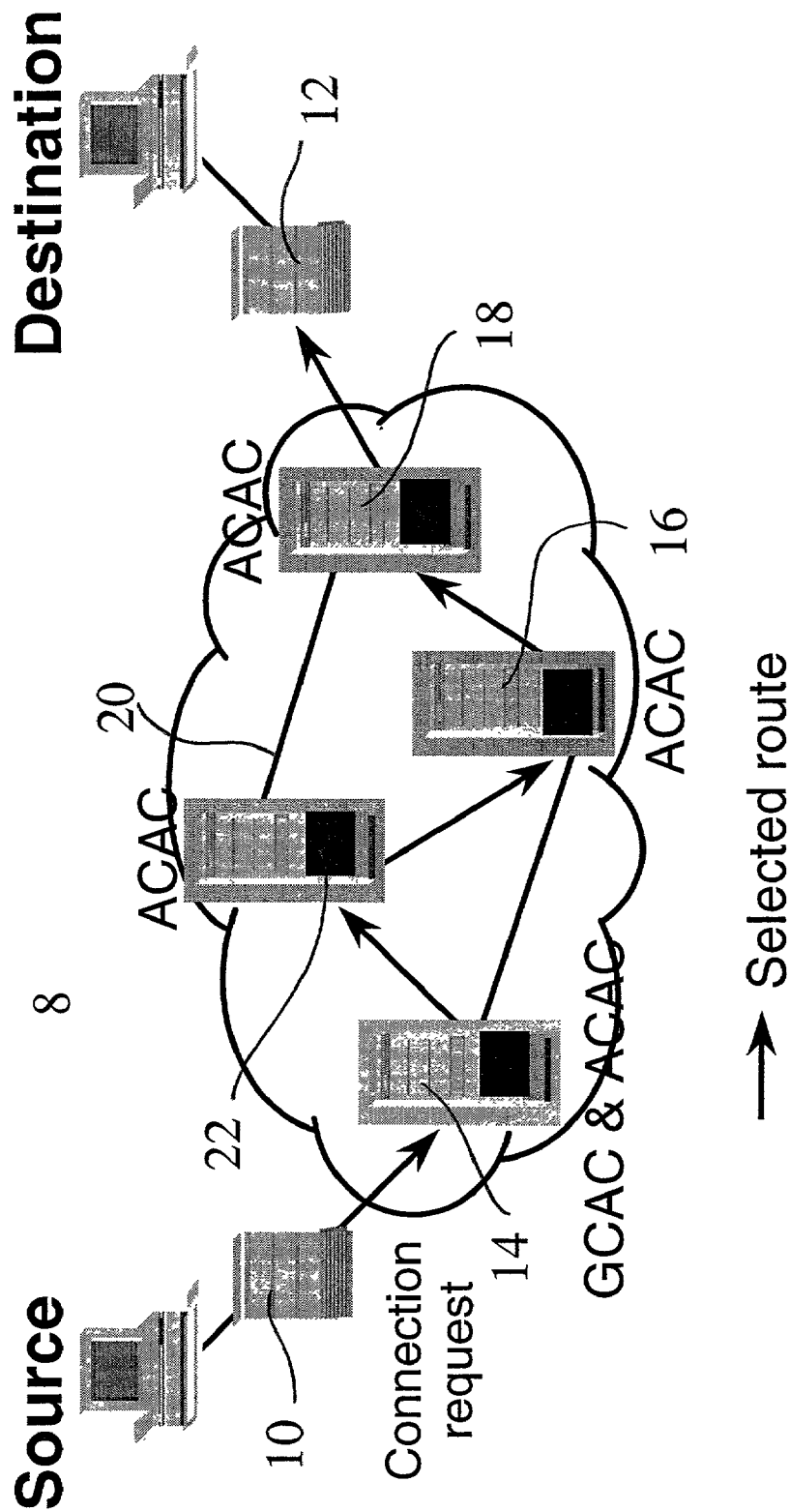
FIG. 1 depicts a multiservice network.
Figure 2:
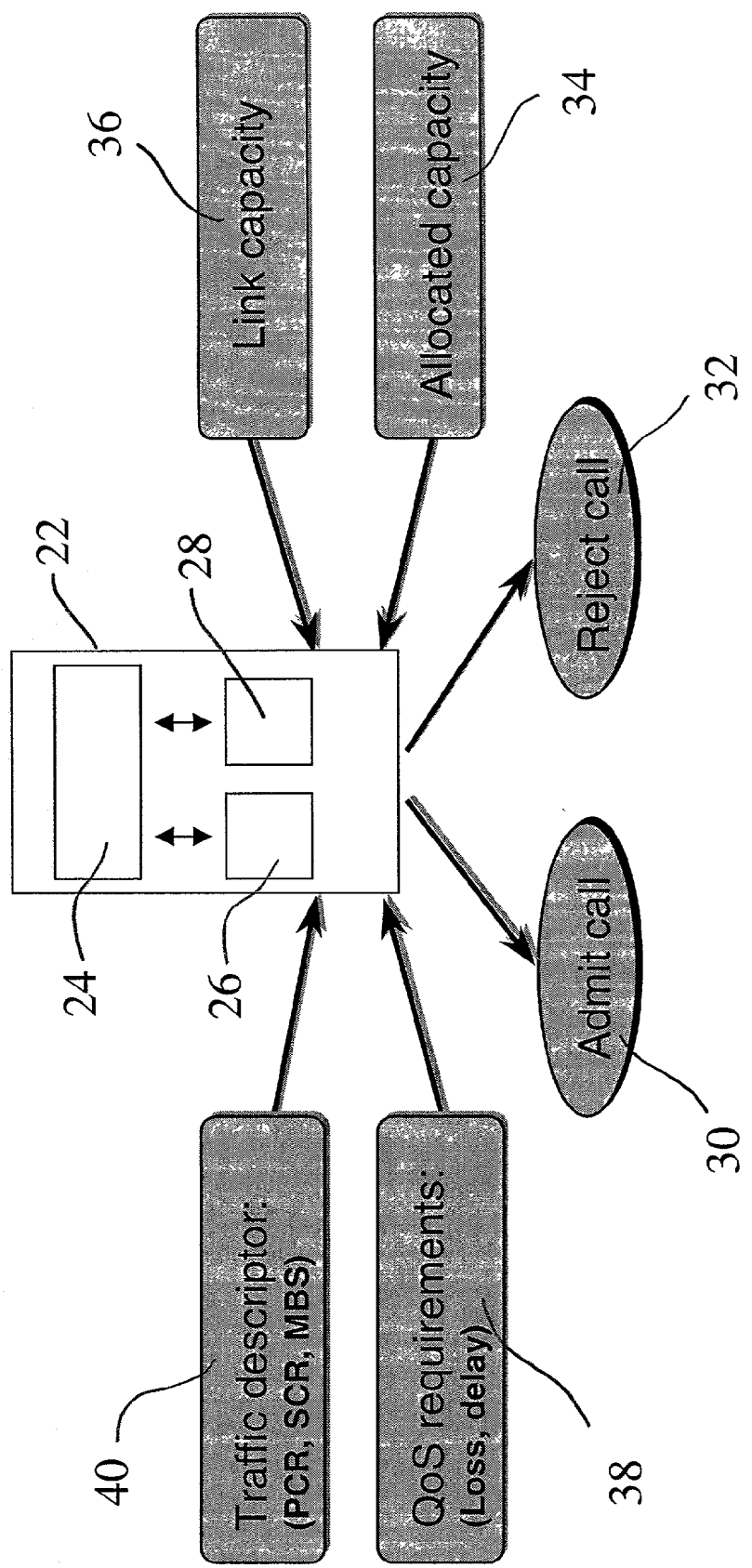
FIG. 2 is a functional block diagram depicting the components of a connection admission control system.
Figure 3:
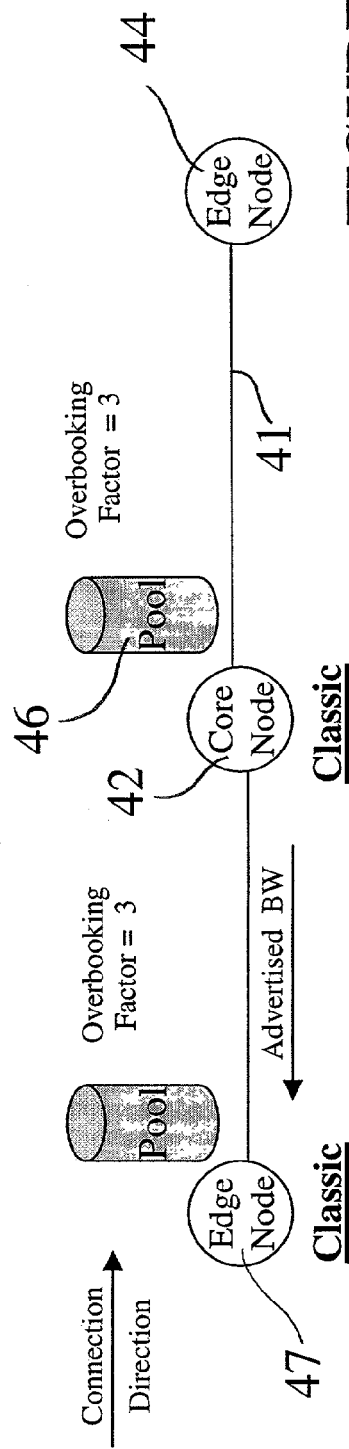
FIG. 3 depicts a classical overbooking model involving a single pool in a homogeneous network.
Figure 4:
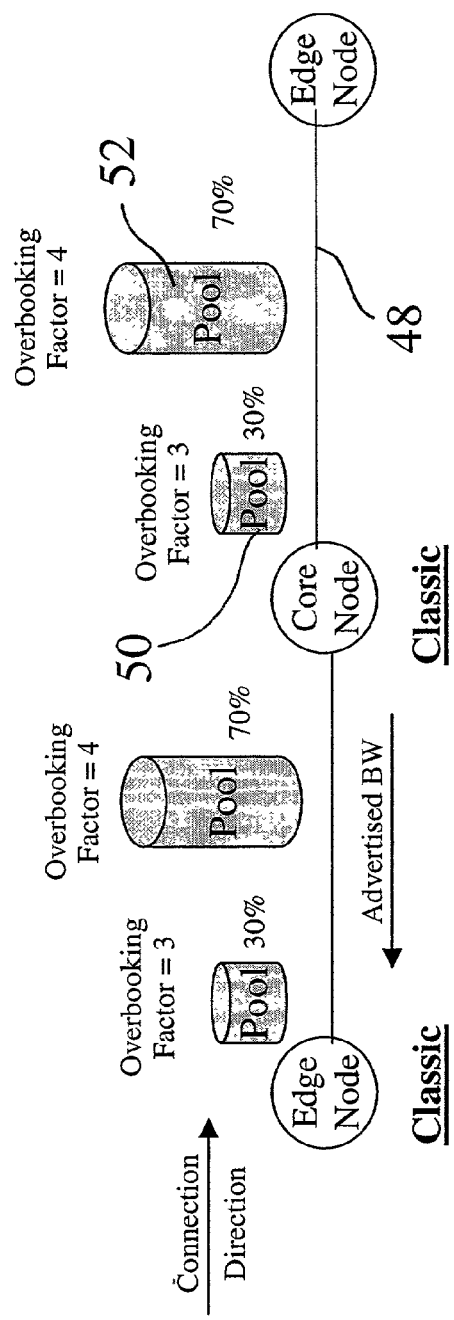
FIG. 4 depicts a classic overbooking model involving multiple pools in a homogeneous network.
Figure 5:
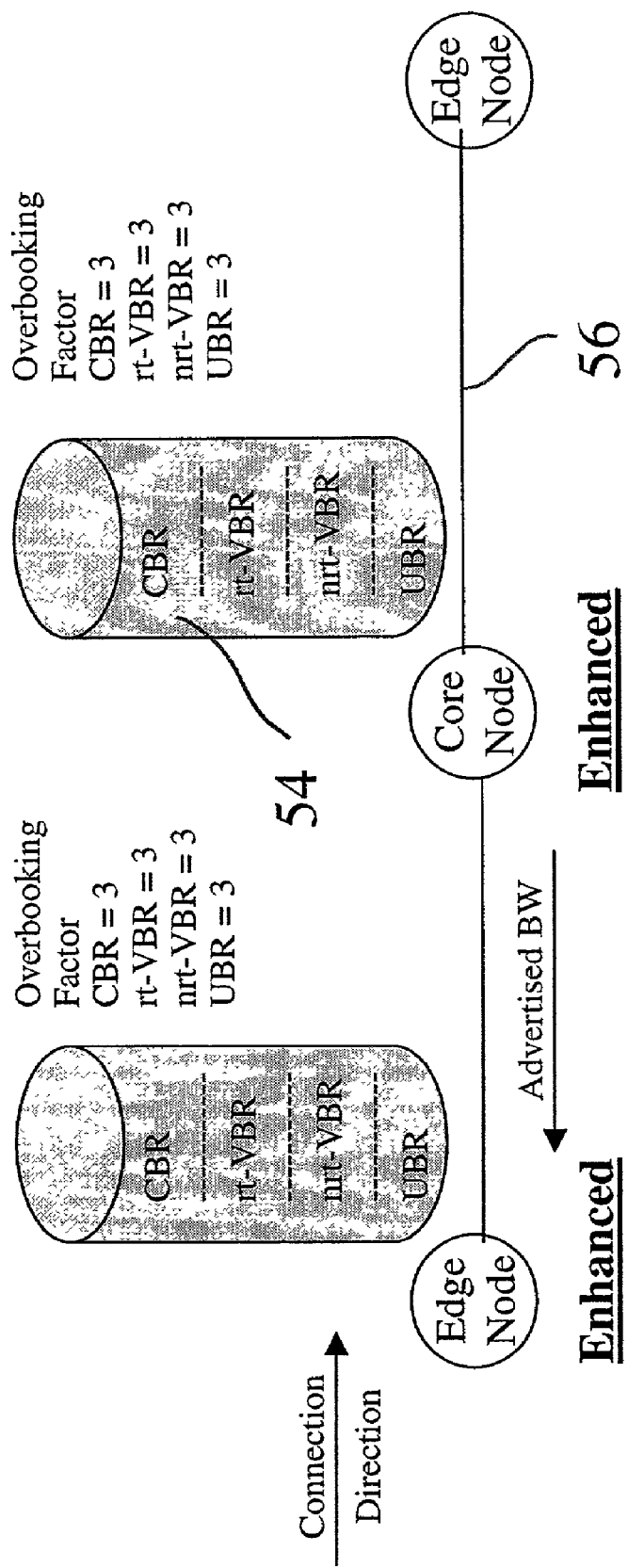
FIG. 5 depicts an enhanced overbooking model involving a single pool with multiple classes in a homogeneous network.
Figure 7:
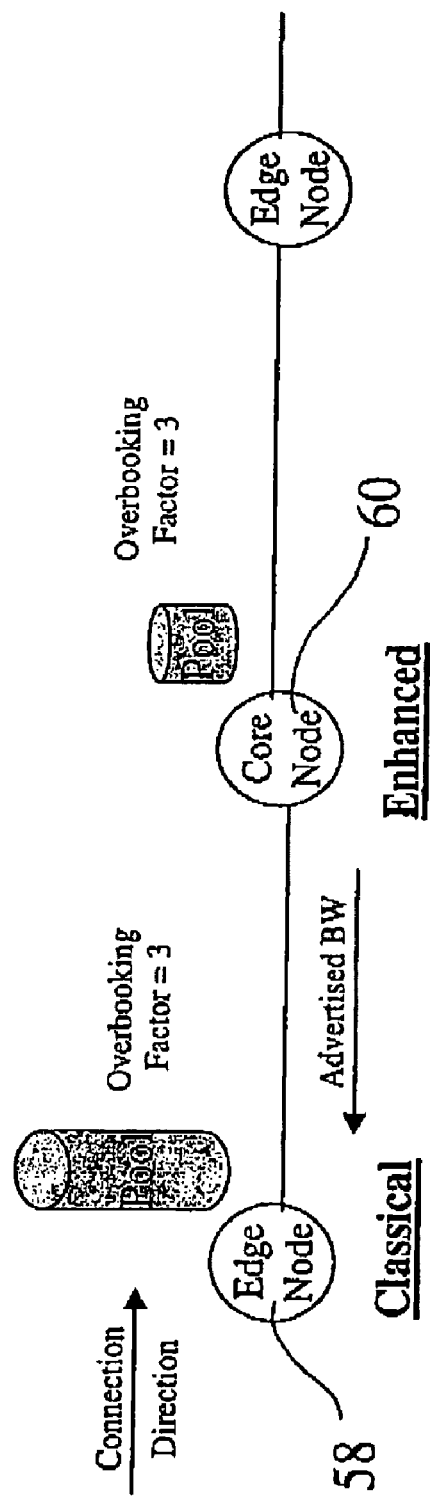
FIG. 7 depicts a network example of a possible overbooking problem in a heterogenous network.
Figure 8:
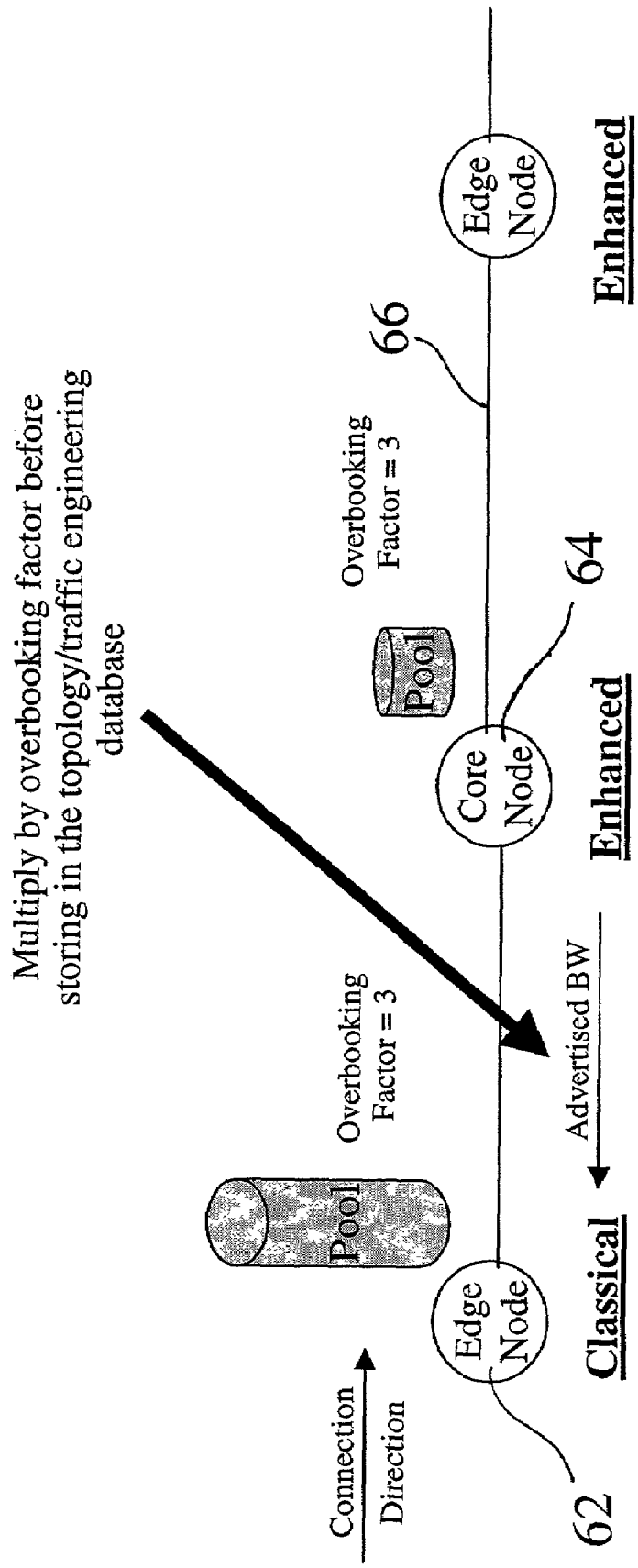
FIG. 8 depicts a first embodiment of the invention.

FIG. 8 depicts a first embodiment of the invention. For the sake of simplicity, the example involves only a single class of data with the same overbooking factor used on all links. In this example, edge node 62 uses a classic bandwidth management model, while core node 64 uses an enhanced bandwidth management model. In order to ensure that the EBW calculated by edge node 62 would account for overbooking, each node must know the overbooking method used by the other nodes. This information is distributed in either of the following ways:

(a) Network/policy management configuration;
(b) Capability exchange during initialization e.g. PNNI Local Management Interface (LMI). As will be understood by those in the art, LMI sends status inquiries, reports, updates and acknowledgements. There are four types of LMI messages:
 (i) Status Inquiry—Requests status information i.e. used as a polling mechanism;
 (ii) Status Report—Sent out in response to a status inquiry message;
 (iii) Update Status—Sent to notify the status change of a connected device;
 (iv) Update Status Ack—Sent in response to an update status;
(c) Advertised available bandwidth messages e.g. PNNI PTSP or MPLS/OSPF-TE Link State Advertisements (LSAs). This is the preferred method.

The use of advertised available bandwidth in both PNNI PTSP and MPLS/OSPF-TE relies on the use of a flooding protocol and link state advertisements (LSAs). Flooding is triggered when a network link changes state. It is initiated by the router/switch that is responsible for that link by sending LSA packets to all of its neighbouring routers/switches. In turn, those neighbours send LSA packets to all of their neighbours ensuring that the change in the link state has been propagated to all nodes in the network.

The present invention requires that the LSA packets carry information relevant to the overbooking method utilized by the node sending those packets. That information is the overbooking method (classical or enhanced) and/or the overbooking factor of the link. A source node upon executing the GCAC algorithm uses this information. The GCAC will take into account the overbooking method and the overbooking factor used by each node along the chosen route, thereby allowing for the internetworking in a heterogeneous environment and avoiding the under loading or overloading of the network as previously discussed.

In the example of FIG. 8, edge node 62 would receive an advertised bandwidth message from core node 64 and normalize the received bandwidth information by multiplying it by the overbooking factor which it has stored in its topology database. In this way, edge node 62 would consider an inflated bandwidth value associated with link 66, instead of the actual value advertised. As a result, edge node 62 (using the classical bandwidth model) will not reject calls which might otherwise have been rejected had the actual value been used in assessing the bandwidth capacity of link 66.

FIG. 9 depicts a table in which possible solutions to overbooking problems in a heterogeneous network are outlined. As highlighted in the last entry, if the edge node uses the enhanced overbooking model and the core node uses the classic overbooking model, then the advertised bandwidth is divided by the overbooking factor. In this way crankback is avoided i.e. calls are not admitted where insufficient link bandwidth is available.

Figure 10:
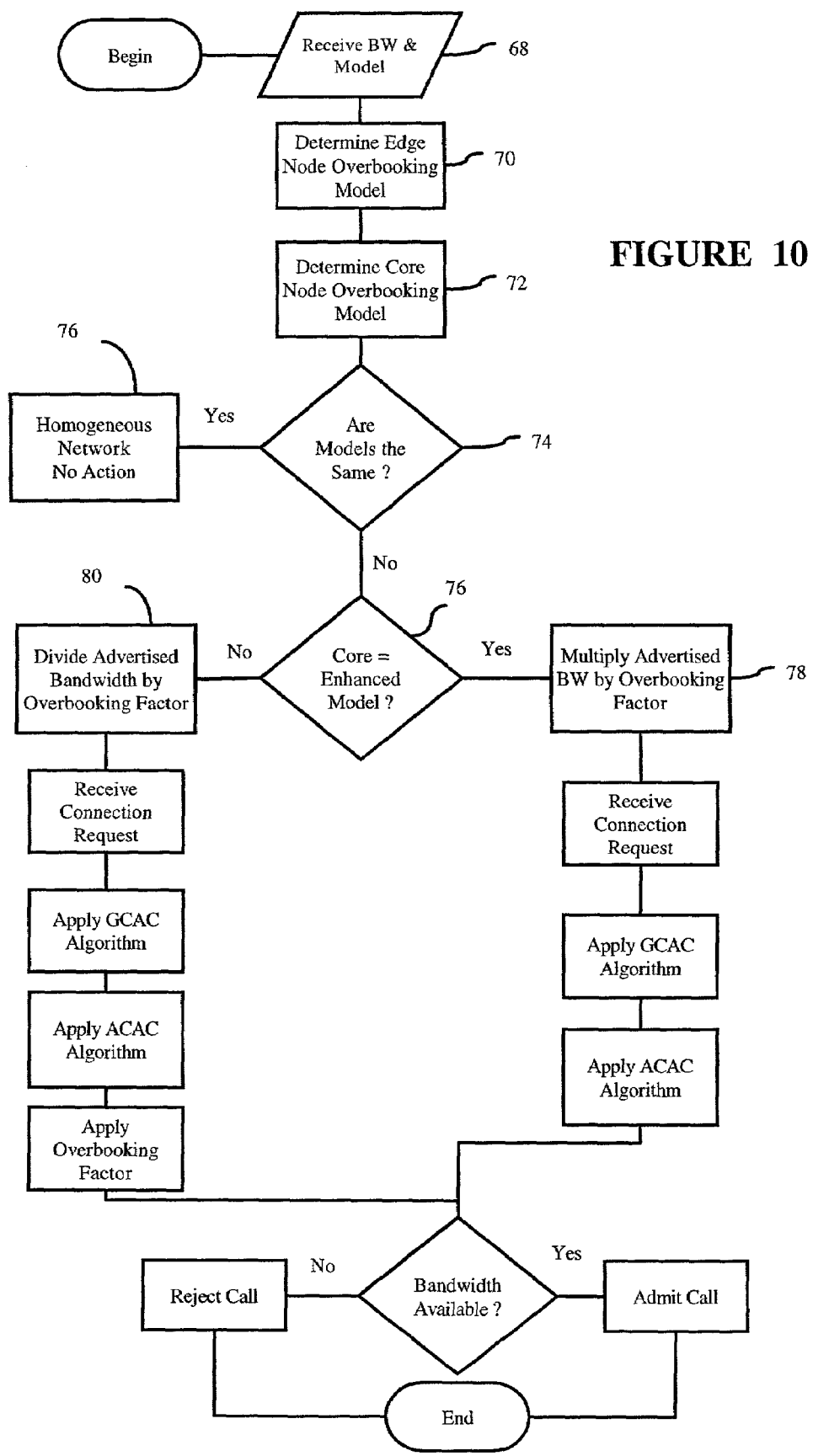
FIG. 10 is a flow chart describing the method of the present invention.

FIG. 10 is a flow chart outlining the method of the present invention. At step 68, the advertised bandwidth and overbooking model of a specified core node is received at a specified edge node. At steps 70 and 72, the overbooking models of the specified edge and core nodes are ascertained. At step 74, if it determined that the nodes use the same overbooking model then it is assumed that the network is homogeneous and no normalization is required. If it is determined that the nodes do not use the same overbooking model, at step 76, the overbooking model used by the core node is determined. If the model is the enhanced model, then at step 78 the advertised bandwidth is multiplied by the overbooking factor. If the model is the classic model, then at step 76 the advertised bandwidth is divided by the overbooking factor. From this point forward, connection admission is performed as described in the background section i.e. after step 78, CAC for an edge node using the classic overbooking model is used, while after step 80, CAC for an edge node using the enhanced overbooking model is used.

The preceding solution assumes that each link in the network uses the same known overbooking factor for all links. However, in some networks different links may use different overbooking factors. This may occur where utilization statistics indicate that some links are less heavily used than other. In this case, if the enhanced overbooking method is used, the edge node must know the overbooking factor used by the sending core node. As previously discussed, the overbooking factor is used when applying GCAC for new calls (or for normalizing the advertised bandwidth).

Figure 11:
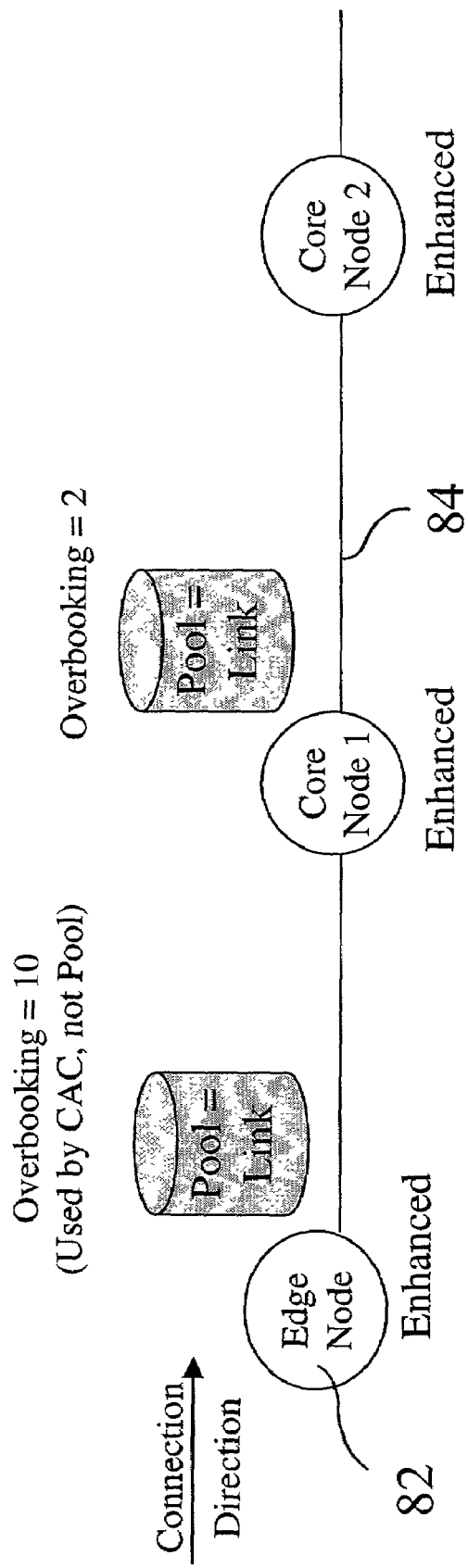
FIG. 11 depicts a second embodiment of the invention.

In the first scenario depicted in FIG. 11, all nodes use the enhanced overbooking model, but different overbooking factors are used on each link. Edge node 82 is made aware of the overbooking model and factor associated with each link (e.g. link 84) in the network through one of the configuration/signaling methods previously outlined. This information along with the advertised bandwidth of link 84 is stored in the topology database of edge node 82. When applying GCAC at edge node 82, the calculated EBW is divided by the overbooking factor for each link before checking bandwidth availability. It is important to note that if both edge and core nodes implement the classic overbooking model, no problem exists as the advertised bandwidth for each node is always the actual bandwidth times the overbooking factor associated with a given link i.e. the edge node simply takes the advertised figure and performs GCAC.

Figure 12:
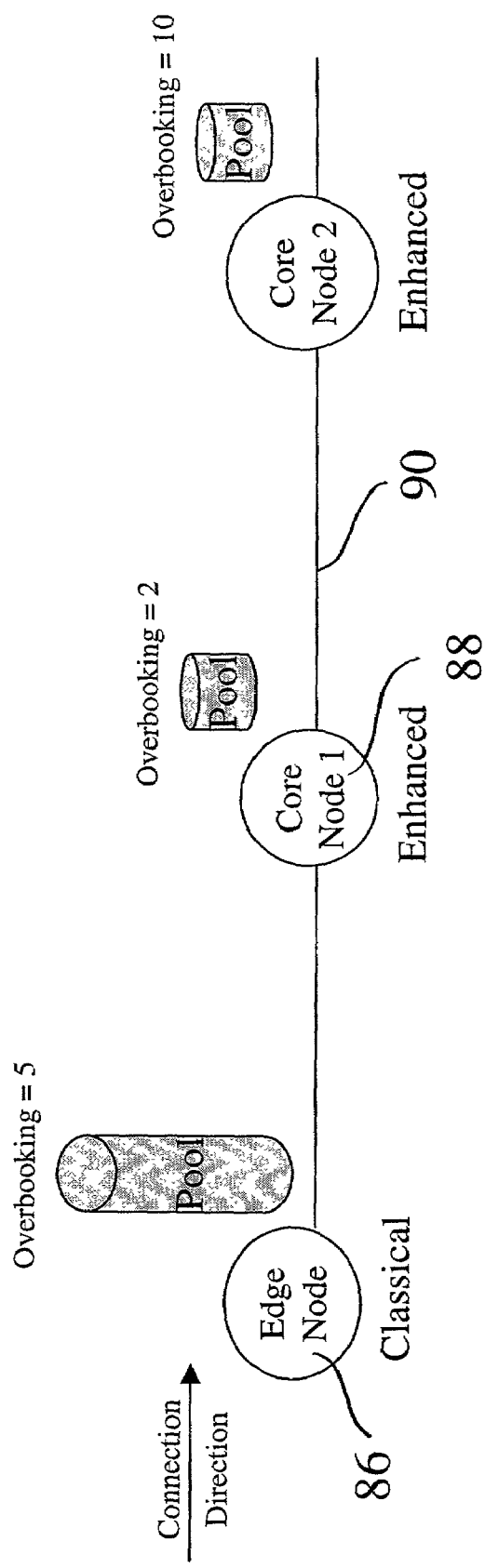
FIG. 12 depicts a third embodiment of the invention.

Referring to FIG. 12, a second scenario is depicted in which edge node 86 uses the classic overbooking model, core node 88 uses the enhanced overbooking model and each link is associated with a different overbooking factor. As with the example of FIG. 11, edge node 86 is made aware of the overbooking model and factor associated with link 90 through one of the configuration/signaling methods previously outlined. The advertised available bandwidth received at edge node 86 will be multiplied by the overbooking factor associated with link 90 before storing it in the topology database. When GCAC is applied at edge node 86, the calculated EBW is compared directly against the stored available bandwidth.

The preceding solutions assume that only one class/class-type is used throughout the network. Additional mechanisms are needed if multiple classes/class-types are involved. Multiple classes/class types are often required to accommodate lower and higher priority traffic. The network nodes must know the overbooking amount for each link, broken down by class/class type. The specific overbooking factor for each class/class-type must be used when the bandwidth is multiplied/divided before it is stored in the topology database, or while applying GCAC. It will be understood by those in the art that within the IP networking environment running the OSPF-TE routing protocol, class-type (CT) refers to the bandwidth pool associated with each link which can be broken down into quality of service (QoS) classes which include: Expedited Forwarding (EF); Assured Forwarding (e.g. Levels 4 and 3 (AF4, AF3)); and Best Effort (BE). These translate roughly to the QoS designations CBR, rt-VBR, nrt-CBR and UBR used in an ATM networking environment running the PNNI routing protocol.

When multiple classes are supported, the following overbooking methods are used:

(a) Classical—the overbooking factor is assigned per bandwidth pool/class type (each of which may include one or more classes). All nodes are updated with the overbooking factors through configuration or signaling exchange; and (b) Enhanced—the overbooking factor is assigned per class. All nodes are updated with the overbooking factors through configuration or signaling exchange.

The typical case is when the same overbooking factor is used uniformly per class/class-type throughout the network. This is similar to the single class-type with uniform overbooking factors on all links. No bandwidth normalization would be needed if all nodes use the same classical or enhanced overbooking model (i.e. homogeneous networks). In the case of heterogeneous networks using both overbooking methods, GCAC performed at the edge node would need to divide/multiply the advertised bandwidth by the overbooking factor, as outlined in the cases previously described. The difference in this case is that the specific overbooking factor for each class must be used, as the factors may be different even if the classes share the same pool. If the network uses different overbooking factors per class/class-type for the various links, each node would have to be updated with the overbooking factors associated with each link through configuration or signaling exchange.

Figure 13:
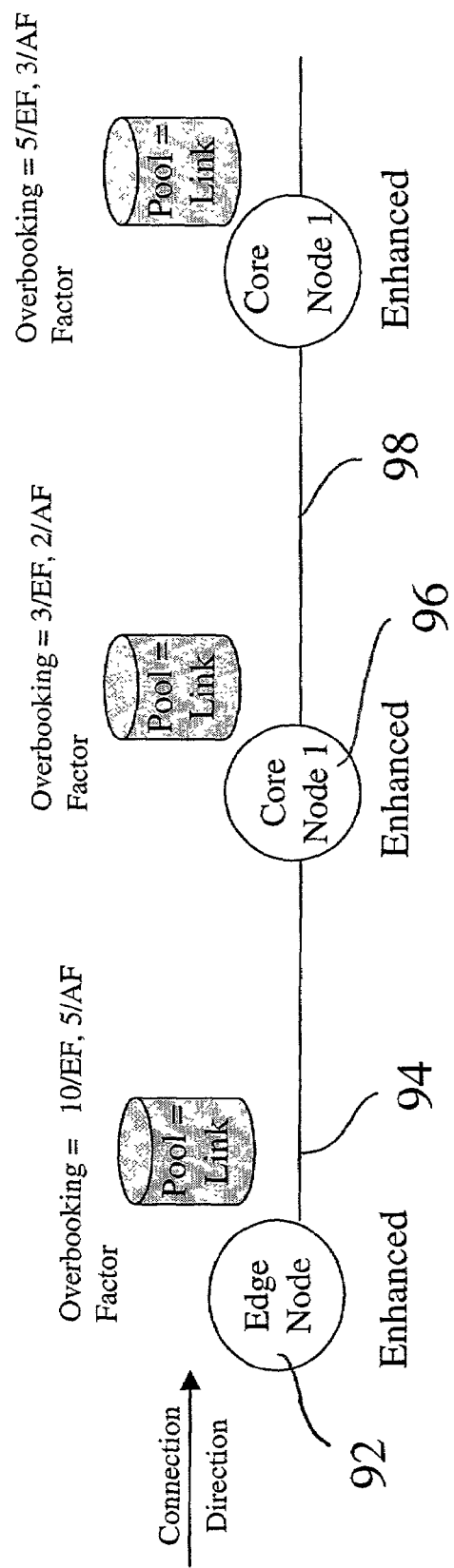
FIG. 13 depicts a fourth embodiment of the invention.

Referring to the example of FIG. 13, there is depicted a network in which all of the nodes utilize the enhanced overbooking model, but in which each pool associated with a link supports 2 classes of data, each class having its own overbooking factor. Edge node 92 utilizes the enhanced overbooking model and is associated with a single bandwidth pool (representing the capacity of link 94) which services EF and AF type traffic, having overbooking factors of 10 and 5 respectively. Core node 96 also utilizes the enhanced overbooking model and is associated with a single bandwidth pool (representing the capacity of link 98) which services EF and AF type traffic, having overbooking factors of 5 and 3 respectively. Edge node 92 is updated with the overbooking factor used by each link and class through configuration or signaling exchange. The advertised available bandwidth for the entire link is stored in the topology database without modification. When GCAC is applied by edge node 92, the calculated EBW is divided by the overbooking factor for each link and class before checking for available bandwidth.

Figure 14:
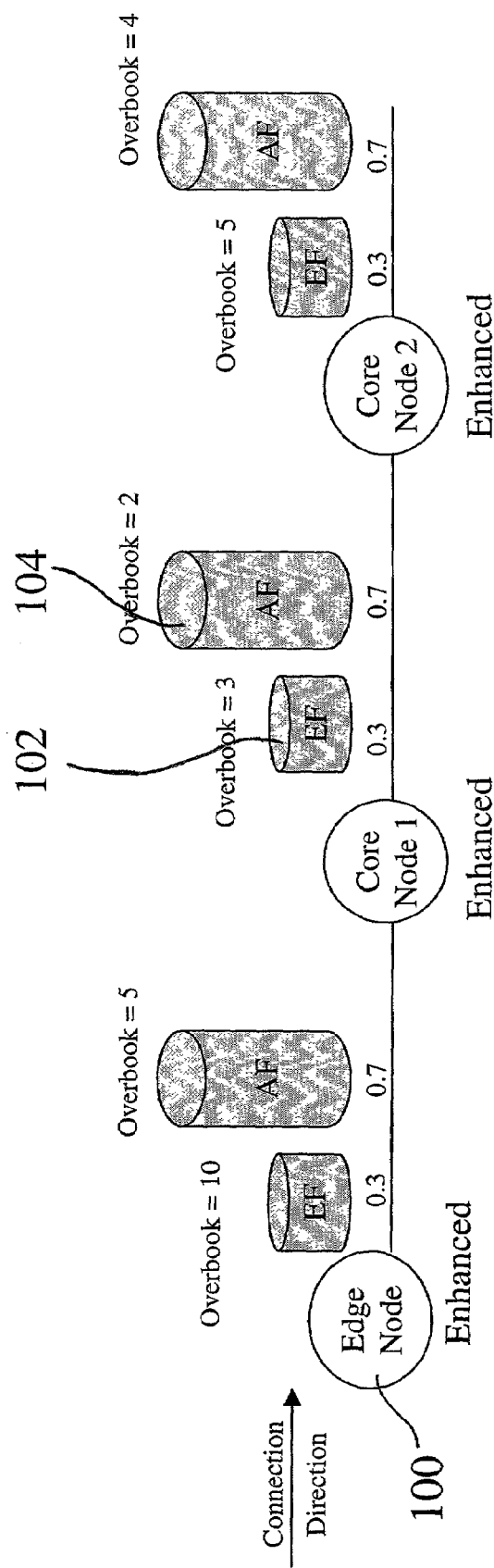
FIG. 14 depicts a fifth embodiment of the invention.

FIG. 14 depicts a slightly different situation in which there are multiple pools or class types with each pool assigned a defined class of data and an associated overbooking factor. The bandwidth pools are typically assigned a portion of the overall capacity of the link based on statistical data regarding traffic history (e.g. in FIG. 14, EF pool 102 is assigned 30% of the link capacity while AF pool 104 is assigned 70% of the link capacity). Edge node 100 is updated with the overbooking factors associated with each link/class through configuration or signaling exchange. The advertised available bandwidth is stored in the topology database without modification. When GCAC is applied, the calculated EBW is divided by the overbooking factor for each link/class before checking available bandwidth.

In-service migration of a network using the classical bandwidth management model to the enhanced bandwidth management model can be achieved in one of two ways:

(a) Migrate the internal nodal bandwidth management features without affecting the network/routing features. In this case, the migrated nodes can take advantage of the enhanced overbooking method internally without changing the advertised bandwidth seen by other nodes. Nodes can be optionally migrated at any time. This migration procedure is relatively simple and does not affect interoperability with other nodes; or (b) Migrate both the internal nodal and network features to take full advantage of the enhanced model and realize network homogeneity. The migration requires two phases. In the first phase, the software is upgraded on all nodes to the enhanced routing protocol as defined previously (e.g. P-NNI, OSPF-TE) to indicate the overbooking model and factors used. This upgrade enables all nodes to correctly interpret the bandwidth update messages received from other nodes. In the second phase, individual nodes are migrated one at a time to the enhanced mode by changing both their internal bandwidth management mechanism and their advertised bandwidth update messages.

Embodiments of the invention may be implemented in any conventional computer programming language. For example, preferred embodiments may be implemented in a procedural programming language (e.g. "C") or an object oriented language (e.g. "C++"). Alternative embodiments of the invention may be implemented as pre-programmed hardware elements, other related components, or as a combination of hardware and software components.

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g. shrink wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

We claim:

1. A method of bandwidth management in a heterogeneous multiservice connection-oriented network, said heterogeneous network supporting one or more classes of data traffic and defined by edge nodes interconnected with core nodes, with pairs of said edge and core nodes being interconnected by a link having a prescribed link capacity, the method comprising:

(a) receiving at a selected one of said edge nodes updates from each of said core nodes detailing a bandwidth management model, one or more overbooking factors and an available link capacity associated with each of said core nodes;

(b) receiving at the selected one of said edge nodes a connection request; and (c) determining at the selected one of said edge nodes a preferred route through said network by accounting for a variation in the overbooking factors, bandwidth management models, or both between the selected one of said edge nodes and each of said core nodes.

2. The method of claim 1 wherein step (c) further includes performing Generic Connection Admission Control (GCAC) at the selected one of said edge nodes following which Actual Connection Admission Control (ACAC) is performed by each of said edge and core nodes to confirm the preferred route selected under GCAC.

3. The method of claim 1 wherein if the selected one of said edge nodes utilizes the enhanced bandwidth management model and the selected one of said core nodes utilizes a classic bandwidth management model, and if an overbooking factor of the overbooking factors is uniform throughout said network, the available link capacity of the selected one of said core nodes is divided by the overbooking factor.

4. The method of claim 1 wherein if the selected one of said edge nodes utilizes a classic bandwidth management model and the selected one of said core nodes utilizes an enhanced bandwidth management model, and if an overbooking factor of the overbooking factors is uniform throughout said network, the available link capacity of the selected one of said core nodes is multiplied by the overbooking factor.

5. The method of claim 1 wherein if the selected one of said edge nodes utilizes an enhanced bandwidth management model and the selected one of said core nodes utilizes the enhanced bandwidth management model, and if an overbooking factor of the overbooking factors associated with the selected one of said edge nodes differs from the overbooking factor associated with the selected one of said core nodes, an equivalent bandwidth (EBW) calculated during Generic Connection Admission Control (GCAC) is divided by the overbooking factor associated with the selected one of said core nodes before bandwidth availability is checked.

6. The method of claim 1 wherein it the selected one of said edge nodes utilizes a classic bandwidth management model and the selected one of said core nodes utilizes an enhanced bandwidth management model, and if an overbooking factor of the overbooking factors associated with the selected one of said edge nodes differs from the overbooking factor associated with the selected one of said core nodes, the available link capacity associated with the selected one of said core nodes is multiplied by the overbooking factor associated with the selected one of said core nodes, and the an equivalent bandwidth (EBW) calculated during Generic Connection Admission Control (GCAC) is compared directly against the result.

7. The method of claim 1 wherein the prescribed link capacity is represented by a single bandwidth pool and wherein the single bandwidth pool services two or more classes of data traffic, with each class of said data traffic being assigned an overbooking factor.

8. The method of claim 7 wherein if the selected one of said edge nodes utilizes an enhanced bandwidth management model and the selected one of said core nodes utilizes an enhanced bandwidth management model, and if the overbooking factors associated with the selected one of said edge nodes differs from the selected one of said core nodes, an equivalent (EBW) calculated during Generic Connection Admission Control (GCAC) is divided by said two or more overbooking factors associated with the selected one of said core nodes before bandwidth availability is checked.

9. The method of claim 1 wherein the prescribed link capacity is divided into two or more bandwidth pools and wherein each of said two or more bandwidth pools services at least one class of data traffic with each class of said data traffic being assigned an overbooking factor.

10. The method of claim 9 wherein if the selected one of said edge nodes utilizes an enhanced bandwidth management model and the selected one of said core nodes utilizes an enhanced bandwidth management model, and if the overbooking factors associated with the selected one of said edge nodes differs from the selected one of said core nodes, the an equivalent (EBW) calculated during Generic Connection Admission Control (GCAC) is divided by the overbooking factor associated with a specified class of data traffic before bandwidth availability is checked.

11. A computer-readable medium, having stored thereon computer executable instructions for performing bandwidth management in a heterogeneous multiservice connection-oriented network, said heterogeneous network supporting one or more classes of data traffic and defined by edge nodes interconnected with core nodes, with pairs of said edge and core nodes being interconnected by a link having a prescribed link capacity, the instructions allowing a processor to:
 (a) receive at a selected one of said edge nodes updates from each of said core nodes detailing a bandwidth management model, one or more overbooking factors and an available link capacity associated with each of said core nodes;
 (b) receive a connection request at the selected one of said edge nodes; and
 (c) determine at the selected one of said edge nodes a preferred route through said network by accounting for a variation in the overbooking factors, bandwidth management models, or both between the selected one of said edge nodes and each of said core nodes.

12. The computer-readable medium of claim 11 wherein instruction (c) further includes performing Generic Connection Admission Control (GCAC) at the selected one of said edge nodes following which Actual Connection Admission Control (ACAC) is performed by each of said edge and core nodes to confirm the preferred route selected under GCAC.

13. The computer-readable medium of claim 11 wherein if the selected one of said edge nodes utilizes an enhanced bandwidth management model and the selected one of said core nodes utilizes a classic bandwidth management model, and if the overbooking factor is uniform throughout said network, the available link capacity of the selected one of said core nodes is divided by an overbooking factor of the overbooking factors.

14. The computer-readable medium of claim 11 wherein if the selected one of said edge nodes utilizes a classic bandwidth management model and the selected one of said core nodes utilizes an enhanced bandwidth management model, and if the overbooking factor is uniform throughout said network, the available link capacity of the selected one of said core nodes is multiplied by an overbooking factor of the overbooking factors.

15. The computer-readable medium of claim 11 wherein if the selected one of said edge nodes utilizes an enhanced bandwidth management model and the selected one of said core nodes utilizes the enhanced bandwidth management model, and if an overbooking factor of the overbooking factors associated with the selected one of said edge nodes differs from an overbooking factor of the overbooking factors associated with the selected one of said core nodes, an Equivalent Bandwidth (EBW) calculated during Generic Connection Admission Control (GCAC) is divided by the overbooking factor associated with the selected one of said core nodes before bandwidth availability is checked.

16. The computer-readable medium of claim 11 wherein if the selected one of said edge nodes utilizes a classic bandwidth management model and the selected one of said core nodes utilizes an enhanced bandwidth management model, and if the overbooking factor associated with the selected one of said edge nodes differs from overbooking factor of the overbooking factors associated with the selected one of said core nodes, the available link capacity associated with the selected one of said core nodes is multiplied by the overbooking factor associated with the selected one of said core nodes, and an Equivalent Bandwidth (EBW) calculated during Generic Connection Admission Control (GCAC) is compared directly against the result.

17. The computer-readable medium of claim 11 wherein the prescribed link capacity is represented by a single bandwidth pool and wherein the single bandwidth pool services two or more classes of data traffic, with each class of said data traffic being assigned an overbooking factor.

18. The computer-readable medium of claim 17 wherein it the selected one of said edge nodes utilizes an enhanced bandwidth management model and the selected one of said core nodes utilizes the enhanced bandwidth management model, and if the overbooking factors associated with the selected one of said edge nodes differs from the selected one of said core nodes, an Equivalent Bandwidth (EDW) calculated during Generic Connection Admission Control (GCAC) is divided by said two or more overbooking factors associated with the selected one of said core nodes before bandwidth availability is checked.

19. The computer-readable medium of claim 11 wherein the prescribed link capacity is divided into two or more bandwidth pools and wherein each of said two or more bandwidth pools services at least one class of data traffic with each class of said data traffic being assigned an overbooking factor.

20. The computer-readable medium of claim 19 wherein if the selected one of said edge nodes utilizes an enhanced bandwidth management model and the selected one of said core nodes utilizes an enhanced bandwidth management model, and if the overbooking factors associated with the selected one of said edge nodes differs from the selected one of said core nodes, the an Equivalent Bandwidth (EBW) calculated during Generic Connection Admission Control (GCAC) is divided by the overbooking factor associated with a specified class of said data traffic before bandwidth availability is checked.

21. An edge node for performing bandwidth management in a heterogeneous multiservice connection-oriented network, said heterogeneous network supporting one or more classes of data traffic and defined by edge nodes interconnected with core nodes, with pairs of said edge and core nodes being interconnected by a link having a prescribed link capacity, the edge node comprising:
 (a) a processor;
 (b) a memory communicating with said processor; and
 (c) an application module communicating with said processor;
wherein said memory has contained therein instructions for allowing the processor to:
 (i) receive updates from each of said core nodes detailing a bandwidth management model, one or more overbooking factors and an available link capacity associated with each of said core nodes;
 (ii) receive a connection request; and
 (iii) determine a preferred route through said network by accounting for a variation in the overbooking factors, bandwidth management models, or both between itself and each of said core nodes.

* * * * *